United States Patent [19]

Rhodes

[11] 4,439,814
[45] Mar. 27, 1984

[54] LASER ADJUSTABLE CAPACITOR AND FABRICATION PROCESS

[75] Inventor: Junior I. Rhodes, Lynchburg, Va.

[73] Assignee: General Electric Company, Lynchburg, Va.

[21] Appl. No.: 407,544

[22] Filed: Aug. 12, 1982

[51] Int. Cl.³ .................. H01G 4/10; H01G 10/00; H01G 7/00
[52] U.S. Cl. .................. 361/321; 29/25.42; 338/195
[58] Field of Search .................. 29/25.42; 361/321; 338/195, 309

[56] References Cited

U.S. PATENT DOCUMENTS

| | | | |
|---|---|---|---|
| 3,267,342 | 8/1966 | Pratt et al. | 361/321 |
| 3,490,055 | 1/1970 | Cox | 361/321 X |
| 3,669,733 | 6/1972 | Allington | 338/195 X |
| 3,996,502 | 12/1976 | Bratschun | 361/321 |
| 4,297,670 | 10/1981 | Solow | 338/195 |
| 4,301,439 | 11/1981 | Johnson et al. | 338/195 |

OTHER PUBLICATIONS

Electronic Design 25, 338-195, Nov. 1966, p. 40, Ruby Laser Process Controls Resistivity.

*Primary Examiner*—Donald A. Griffin
*Attorney, Agent, or Firm*—Cushman, Darby & Cushman

[57] ABSTRACT

A thick film hybrid circuit capacitor particularly suitable for laser trimming and a process for its fabrication. The fabrication steps include the application of a green dam glass after the firing of the dielectric and top conductor of the capacitor to provide mechanical protection while allowing communication of the outside environment to the capacitor. In this way, a capacitor that is laser trimmed many weeks after fabrication and at humidity equilibrium will not suffer a sudden change of environment and attendant capacitance value change. After trimming the capacitor can be isolated from the outside environment by a traditional sealant protective material. The fabrication steps are also applicable for building a thick film hybrid crossover.

32 Claims, 2 Drawing Figures

LASER ADJUSTABLE CAPACITOR AND FABRICATION PROCESS

BACKGROUND OF THE INVENTION

This invention relates in general to thick film electric circuit elements and to methods for fabricating electronic circuits that include thick film capacitors and/or thick film cross-overs.

There are various fabrication techniques known for making hybrid circuits including thick film capacitors. One such well-known technique is set forth in U.S. Pat. No. 3,669,733 - Allington, issued June 13, 1972. In the fabrication technique set forth in that patent, patterns of circuit interconnections and various passive circuit components such as resistors and capacitors are printed in layers or mounted on a ceramic substrate to form a hybrid thick film circuit.

Other U.S. Patents related to the fabrication of electronic circuits are listed below. This list is not intended to be exhaustive, but rather only representative.

U.S. Pat. No. 4,238,662 - Lao (12/9/80)
U.S. Pat. No. 4,238,661 - Braunlich (11/9/80)
U.S. Pat. No. 4,061,584 - Girard et al (12/6/77)
U.S. Pat. No. 4,007,296 - Ansell et al (2/8/77)
U.S. Pat. No. 3,882,059 - Elderbaum (5/6/75)
U.S. Pat. No. 3,864,159 - Field et al (2/4/75)
U.S. Pat. No. 3,688,361 - Bonini (9/5/72)
U.S. Pat. No. 3,665,269 - Wright et al (5/23/72)
U.S. Pat. No. 3,617,834 - Rayburn (11/2/71)
U.S. Pat. No. 3,609,483 - Smyly (9/28/71)
U.S. Pat. No. 3,604,082 - McBrayer et al (9/14/71)
U.S. Pat. No. 3,591,905 - Elderbaum (7/13/71)
U.S. Pat. No. 3,582,729 - Girard (6/1/71)
U.S. Pat. No. 3,565,570 - Dien (1/23/71)
U.S. Pat. No. 3,544,434 - Giller (12/1/70)
U.S. Pat. No. 3,480,421 - Allen (11/25/69)
U.S. Pat. No. 3,456,170 - Hatch (7/15/69)
U.S. Pat. No. 3,453,781 - Greenman III (7/8/69)
U.S. Pat. No. 3,394,386 - Weller et al (7/23/68)
U.S. Pat. No. 3,179,545 - Bowers (4/20/65)
U.S. Pat. No. 3,123,497 - Barnes et al (3/3/64)
U.S. Pat. No. 3,002,137 - Kahn et al (9/26/61)

The subject matter of these patents as well as that of the Allington '733 patent are incorporated herein by reference.

Utilizing known fabrication techniques certain difficulties arise in the mass production of electronic circuits. Screen printed capacitors formed by the printing of a lower conductor electrode, then printing one or two layers of dielectric material and finally printing an upper electrode conductor are somewhat delicate and therefore are subject to damage. In the mass production of hybrid thick film circuits including one or more capacitors on a substrate, many mechanical manipulations and processing steps are required to fabricate the complete circuit. The fabrication may include one or more high temperature firings other than for just the formation of the capacitors. In the handling of the circuits during manufacture, screen printed capacitors are likely to be damaged. This is particularly true when hybrid circuit substrates must be stacked (usually 2-3 feet in automated carriers) for mechanical manipulation. Such stacking abraids the materials printed onto the substrate thereby damaging the components. Therefore mechanical protection of the circuit must be provided.

Another problem arises when thick film capacitors are to be laser-trimmed to a predetermined precise capacitance value. When a precisely valued capacitor is required, it is desirable to form a thick film capacitor on the substrate and then trim it after the entire electronic circuit is constructed and aged. As the circuit ages, capacitance values tend to change. If the capacitors are laser trimmed they may shift in capacitance value as they age after laser trimming. Trimming a capacitance value prematurely, i.e. before complete fabrication of the circuit will result in the capacitor changing value as a result of the additional processing steps required for completion of the circuit, i.e. additional heating and cooling steps where mechanical manipulation will change the capacitance value. In order to protect the capacitor, it is known to use a protective sealant composition such as desired in the Allington '733 patent. However, the use of such a protective composition does not completely solve all of the operational problems.

Protective sealant compositions effectively seal off or isolate the capacitor from its surrounding environment. During the aging process when the circuit is setting for a period of time before the capacitors are laser trimmed, there develops a humidity non-equilibrium. In other words, the environment of the capacitor inside the sealant material becomes different from the environment outside of the sealant material. After the sealant material is cut by the laser trimming process, the environments equalize and the value of capacitance over time may change as a result of the environmental change.

SUMMARY OF THE INVENTION

In order to overcome these operational difficulties associated with the mass production of thick film hybrid integrated circuits, applicant provides a fabrication method including the use of green dam glass as a protective cover for a printed thick film capacitor. The green dam glass is substituted for the conventional sealants now in common use. By applying a layer of green dam glass after the capacitor is formed the capacitor is sufficiently protected to withstand the firing temperatures to which the circuit is subjected when subsequent layers of material are fired such as for example when other components are added to the substrate. The green dam glass also provides a mechanical protection for process handling prior to laser cutting such as for example when the circuits are stacked 2-3 feet in automated carriers.

A significant advantage is achieved for circuits including capacitors that are to be laser trimmed to a precise value. The substitution of green dam glass in place of traditional sealants allows the capacitor to breath, i.e. maintain environmental stability during the aging process prior to laser cutting. The green dam glass, unlike other protective sealants, is porous. The glass is not used as a sealant such as in conventional fabrication techniques. Rather, it is used as an open cell protective material.

After the capacitor is formed by printing the lower conductor, dielectric, and upper conductor, a layer of green dam glass is applied. The glass provides mechanical protection for the capacitor while permitting free communication of the surrounding environment to it. Thus, there is maintained a humidity equilibrium from the time the capacitor is formed until the final laser trimming thereof. After trimming, to protect the electrical properties of the capacitor from excessive environmental stresses a sealing compound can be printed over the hybrid device.

BRIEF DESCRIPTION OF THE DRAWINGS

A preferred exemplary embodiment of the invention will be described with reference to the drawings, wherein.

DETAILED DESCRIPTION OF THE PREFERRED EMBODIMENT

Figure 1:
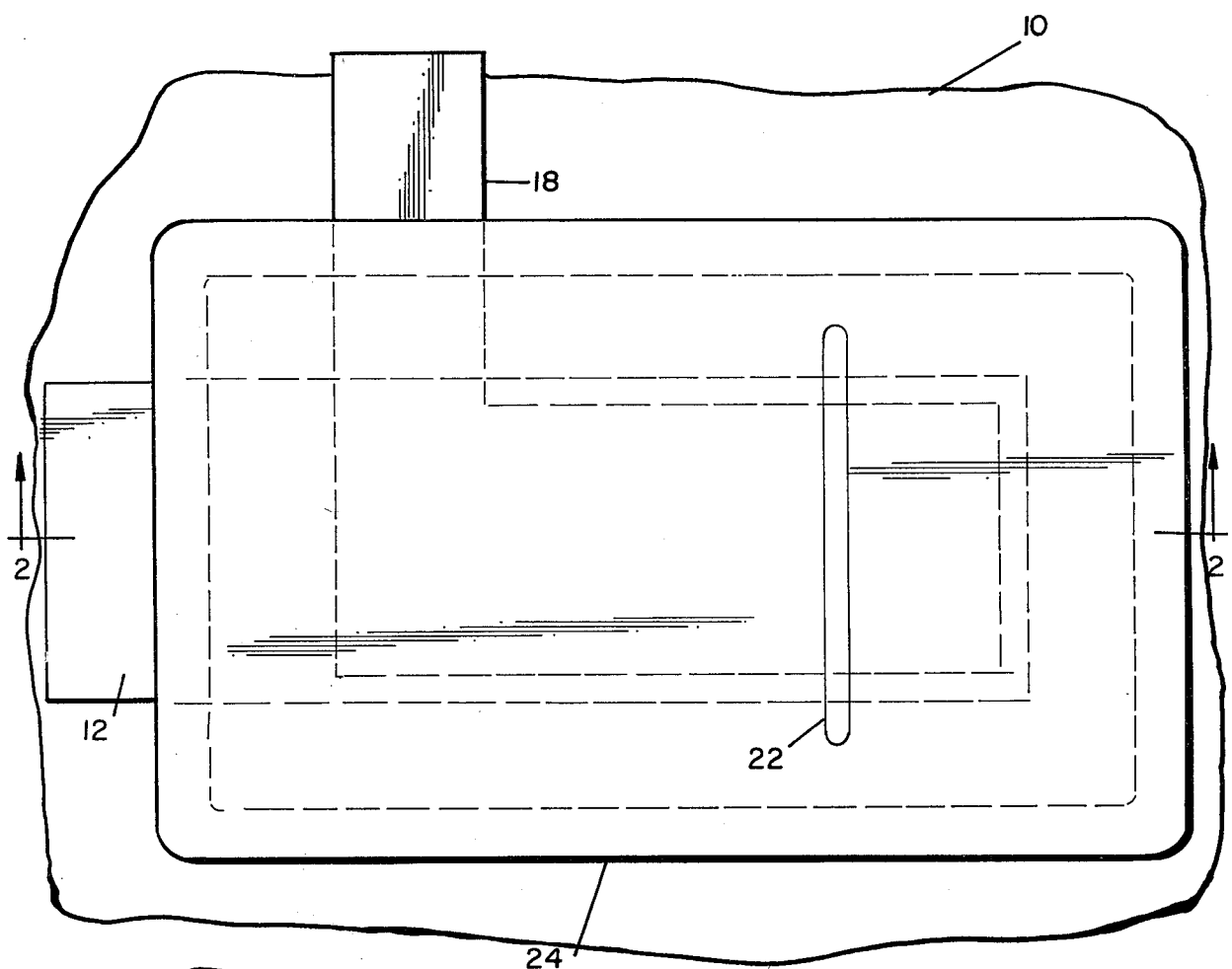
FIG. 1 is a top view of a laser-trimmed capacitor according to the present invention.

The following is a step-by-step fabrication technique of a preferred exemplary embodiment of the present invention. The steps set forth below apply to the fabrication of either a thick film capacitor or to a cross-over (one wire run crossing over another). Naturally, the thick film capacitor or cross-over would form only a small element or portion of a hybrid thick film circuit. The specific fabrication steps for the other elements of the thick film circuit are not discussed.

First, on a ceramic substrate, there is printed a bottom conductor for the capacitor (or cross-over). This is a metallization that is printed according to standard screening techniques. After the bottom conductor is printed, it is allowed to dry 15 minutes at 150° C. After drying, the substrate with the printed bottom conductor is fired using a standard 850° C. profile. The profile is in essence a curve of temperature vs. time for that period of time during which the circuit is on a conveyor belt travelling through the firing furnace.

After firing the substrate having the bottom conductor printed thereon, the dielectric material for the capacitor or cross-over is printed. Preferably, the dielectric material is a high dielectric constant material such as Dielectric Composition 8229 manufactured by E. I. DuPont de Nemours & Co., Inc. (Dupont). See DuPont specification A-8859 revised 10/73. This is one material in a family of dielectric pastes or inks manufactured by DuPont which are screenable liquid materials having a predetermined viscosity. These materials are thixotropic, i.e. they experience a viscosity change with shearing forces so that they will not smear or smudge.

The dielectric material is printed using a screen having a mesh/wire diameter ratio of 280/1.2 mil. Screening is accomplished using a photosensitive technique such as using a plastic material mesh emulsion that is 0.5±0.1 mils. thick processed at 90° C. The mesh emulsion is exposed to ultra-violet light and developed to form the desired dielectric pattern. Once the pattern is formed, the dielectric material is applied through the screen onto the bottom conductor previously fired. After the dielectric material is screened, the circuit is allowed to settle for five minutes and then dried for a minimum of fifteen minutes at 150° C. A typical thickness as measured with a light section microscope of the dielectric would be a wet thickness range of 35–45 microns in a dry thickness range of 20–30 microns.

After application of a dielectric layer, a second dielectric layer is printed in the same manner in which the first dielectric layer was printed. Using a second layer of dielectric guarantees an integrity of coverage. It is possible during application of a dielectric layer for there to develop pinholes from out-gasing, bubbling, dust, or screen imperfections. By using two dielectric layers, it is highly improbable that pinholes will develop in each layer at corresponding positions. Thus, by using two layers, integrity of the formation of a dielectric layer is assured. After application of the second dielectric layer, the circuit is allowed to dry for a minimum of 15 minutes at 150° C. A typical thickness of both coats of dielectric would be a wet thickness range of 35-50 microns and a dry thickness range of 35–50 microns.

After application and drawing of the second dielectric layer, the top conductor is printed using a standard screen. After printing of the top conductor, it is allowed to dry for a minimum of 15 minutes at 150° C. Then the top conductor is fired using a standard 850° profile. It should be noted that the dielectric layers were not fired. This firing that occurs after the application of the top conductor is the first firing to occur after the firing of the bottom conductor.

After the co-firing of the dielectric layers and top conductor, the protection green dam glass is applied. Thick Film Dielectric Composition DP-8592 or DP-8692 for Low Profile Solder Dams manufactured by DuPont and originally intended for use as a solder dam material. See DuPont specification A-74683 dated 11/71.

The glass is applied over the entire capacitor using a screen having a mesh/wire diameter of 280/1.2 mil. applied with an emulsion at 90° of 9.5 mil plus or minus 0.1 mil or 325/1.1 mil using an emulsion at 90 degrees of 0.5 mil plus or minus 0.1 mil. Typically, a dry thickness range for the green dam glass will be 12–25 microns. After application of the green dam glass, the circuit is allowed to dry 15 minutes at 150° C. Then it is fired using a standard 850° profile. After firing, the circuit is stored for a minimum of one week to age.

As stated above, other circuit elements and devices may be included on the hybrid circuit during fabrication. We will assume from this point on that the circuit has been fully fabricated and that whatever production steps are to have taken place are completed.

After the circuit has been aged, the capacitor can be laser trimmed if desired. However, the use of laser trimming is not essential to the fabrication technique of the present invention. The invention does have particular advantageous results when applied to circuits in which capacitors must be laser trimmed as discussed in the summary section above.

After laser trimming, if laser trimming is to be done, a sealing compound can be printed over the hybrid circuit. Preferably the sealing compound is Protective Coating #240-SB manufactured by Electro-Science Laboratories, INC. 2211 Sherman Avenue, Pennsauken, New Jersey 08110. See Electro-Science Laboratories Bulletin #42479. Protective Coating #240-SB is a screen printable, resin type mineral filled silicone intended for protecting thick film resistors, capacitors, and circuits. It is cured rather than fired. Therefore, it is applied at the end of the fabrication steps when it is no longer required that the circuit be subjected to high temperatures for firing other components. The sealing compound is applied using a screen having a mesh/wire diameter of 2/1.6 mil using an emulsion of 90°−0.5±0.1 mil.

After the sealing compound is screened, the circuit is allowed to dry for 15 minutes at 100° C.-125° C. A typical thickness range for the sealing compound would be 25-45 microns. After drying of the screen sealing compound, the compound is allowed to cure for 5 minutes at 350° C. The sealing compound begins to cure at 150° C. The dry cycle at the lower temperature permimts the material to flow and gel before it is fully cured. Elevation of the cure temperature afterwards should be as fast as possible.

Figure 2:
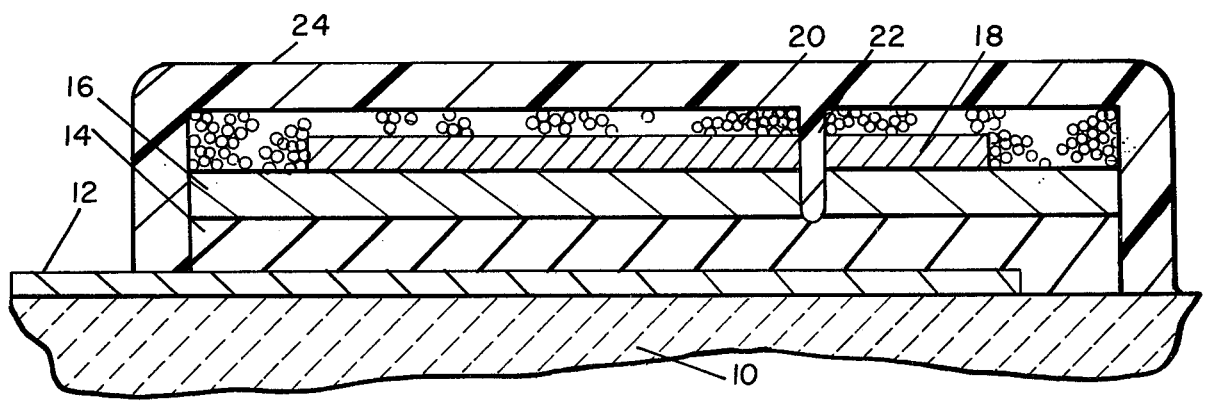
FIG. 2 is a side cut-away view of the laser-trimmed capacitor shown in top view FIG. 1.

Referring now to FIGS. 1 and 2 there are respectively shown top and cut-away side views of a laser-trimmed capacitor fabricated in accordance with the previously detailed method steps. The capacitor is formed on a hybrid circuit substrate 10 usually made of ceramic. A bottom conductor 12 is then printed onto substrate 10. After drying and firing the first dielectric layer 14 is printed (not shown in FIG. 1). Then the second dielectric layer 16 (not shown in FIG. 1) is printed over the first dielectric layer. After the dielectric layers are dried, top conductor layer 18 is applied. After cofiring the dielectric layers and top conductor layer 18, the layer of green dam glass 20 (not shown in FIG. 1) is applied. The capacitor is then aged, the green dam glass permitting the external environment to reach the capacitor.

The capacitor can then be laser-trimmed by making a laser cut 22 through glass layer 20, top conductor 18 and partially into the dielectric layers 14 and 12 to precisely set the capacitance value. The sealing compound (encapsulant) 24 is then applied to protect the trimmed capacitor.

A crossover would be formed in the same manner as the capacitor using different dimensions of conductors and different dielectric values than used for the capacitor.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

I claim:

1. A method for fabricating a laser trimmable capacitor, comprising the steps of:
   providing a substrate;
   providing the capacitor on the substrate;
   applying a porous material over the capacitor to provide mechanical protection for the capacitor while allowing the outside environment to be in contact with the capacitor via the material's pores and
   aging the porous material covered printed capacitor, whereby there is formed a capacitor that can be laser trimmed without changing the environment in contact with the capacitor.

2. A method according to claim 1 wherein the step of applying a porous material comprises the step of applying a green dam glass over the capacitor.

3. A method according to claim 2 wherein the step of applying a green dam glass comprises the steps of:
   printing the green dam glass over the capacitor;
   drying the printed green dam glass; and
   firing the green dam glass.

4. A method according to claim 1 or 2 wherein the step of providing the capacitor comprises the steps of:
   printing a bottom conductor of the capacitor on the substrate;
   drying the bottom conductor;
   firing the bottom conductor;
   printing a dielectric layer over the bottom conductor;
   drying the dielectric;
   printing a top conductor of the capacitor over the dielectric layer; and
   co-firing the dielectric layer and top conductor, whereby the capacitor is provided on the substrate.

5. A method according to claim 2 wherein the step of applying a green dam glass comprises the step of applying a thick film dielectric composition.

6. A method according to claim 5 wherein the step of applying a thick film dielectric composition comprises the step of applying a thick film dielectric composition from the group consisting of: DP-8592 and DP-8692 manufactured by E. I. DuPont de Nemours & Co. (Inc.).

7. A method according to claim 1 or further including the step of laser trimming the aged, glass covered capacitor to a desired value of capacitance.

8. A method according to claim 1 further including the step of providing an encapsulant layer over the green dam glass layer.

9. A method for fabricating a protected hybrid circuit cross-over, comprising the steps of:
   providing a substrate;
   printing a cross-over on the substrate;
   applying a green dam glass over the printed cross-over to provide mechanical protection for the cross-over while allowing the outside environment to be in contact with the cross-over via the natural porosity of the glass; and
   aging the glass covered printed cross-over, whereby said protected cross-over is provided.

10. A method according to claim 9 wherein the step of applying a green dam glass comprises the steps of:
    printing the green dam glass over the cross-over;
    drying the printed green dam glass; and
    firing the green dam glass.

11. A method according to claim 9 further including the step of laser trimming the aged, glass covered cross-over to desired value of dimensions.

12. A method according to claim 9 wherein the step of printing the cross-over comprises the steps of:
    printing a bottom conductor of the cross-over on the substrate;
    drying the bottom conductor;
    firing the bottom conductor;
    printing a dielectric layer over the bottom conductor;
    drying the dielectric;
    printing a top conductor of the cross-over over the dielectric layer; and
    co-firing the dielectric layer and top conductor, whereby the cross-over is printed on the substrate.

13. A method according to claim 9 wherein the step of applying a green dam glass comprises the step of applying a thick film dielectric composition.

14. A method according to claim 9 further including the step of providing an encapsulant layer over the green dam glass.

15. A laser trimmable capacitor formed by the following fabrication steps:
    providing a substrate;
    providing the capacitor on the substrate;
    applying a porous material over the capacitor to provide mechanical protection for the capacitor while allowing the outside environment to be in contact with the capacitor via its porosity; and
    aging the porous material covered printed capacitor, whereby there is formed a capacitor that can be laser trimmed without changing the environment in contact with the capacitor.

16. A capacitor according to claim 15 wherein the step of applying a porous material comprises the step of applying a green dam glass over the capacitor.

17. A capacitor according to claim 16 wherein the step of applying a green dam glass comprises the steps of:
printing the green dam glass over the capacitor;
drying the printed green dam glass; and
firing the green dam glass.

18. A capacitor according to the claim 15 or 16 wherein the step of providing the capacitor comprises the steps of:
printing a bottom conductor of the capacitor on the substrate;
drying the bottom conductor;
firing the bottom conductor;
printing a dielectric layer over the bottom conductor;
drying the dielectric;
printing a top conductor of the capacitor over the dielectric layer; and
co-firing the dielectric layer and top conductor, whereby the capacitor is provided on the substrate.

19. A capacitor according to claim 16 wherein the step of applying a green dam glass comprises the step of applying a thick film dielectric composition.

20. A capacitor according to claim 19 wherein the step of applying a thick film dielectric composition comprises the step of applying a thick film dielectric composition from the group consisting of: DP-8592 and DP-8692 manufactured by E. I. DuPont de Nemours & Co. (Inc.).

21. A capacitor according to claim 15 further including the step of laser trimming the aged, glass covered capacitor to a desired value of capacitance.

22. A capacitor according to claim 15 further including the step of applying an encapsulant layer over the green dam glass.

23. A protected cross-over formed by the following fabrication steps:
providing a substrate;
printing a cross-over on the substrate;
applying a green dam glass over the cross-over to provide mechanical protection for the cross-over while allowing the outside environment to be in contact with the cross-over via the natural porosity of the glass; and
aging the glass covered printed cross-over, whereby said protected cross-over is provided.

24. A cross-over according to claim 23 wherein the step of applying a green dam glass comprises the steps of:
printing the green dam glass over the cross-over;
drying the printed green dam glass; and
firing the green dam glass.

25. A cross-over according to claim 23 further including the step of laser trimming the aged, glass covered cross-over to a desired dimensions.

26. A cross-over according to claim 23 wherein the step of printing the cross-over comprises the steps of:
printing a bottom conductor of the cross-over on the substrate;
drying the bottom conductor;
firing the bottom conductor;
printing a dielectric layer over the bottom conductor;
drying the dielectric;
printing a top conductor of the cross-over over the dielectric layer; and
co-firing the dielectric layer and top conductor, whereby the cross-over is provided on the substrate.

27. A cross-over according to claim 23 wherein the step of applying a green dam glass comprises the step of applying a thick film dielectric composition.

28. A cross-over according to claim 23 further including the step of providing an encapsulant layer over the green dam glass.

29. A capacitor, comprising:
a substrate;
a bottom conductor formed on said substrate;
a dielectric formed on said bottom conductor;
a top conductor formed on said dielectric; and
a layer of green dam glass formed over said top conductor.

30. A capacitor according to claim 29 further including an encapsulant covering said green dam glass, top conductor, dielectric, and bottom conductor.

31. A cross-over, comprising:
a substrate;
a bottom conductor formed on said substrate;
a dielectric formed on said bottom conductor;
a top conductor formed on said dielectric; and
a layer of green dam glass formed over said top conductor.

32. A cross-over according to claim 31 further comprising an encapsulant covering said green dam glass, top conductor, dielectric, and bottom conductor.

* * * * *